[11] 3,602,310

| [72] | Inventor | William G. Halbert |
| | | Butte, Mont. |
| [21] | Appl. No. | 3,228 |
| [22] | Filed | Jan. 15, 1970 |
| [45] | Patented | Aug. 31, 1971 |
| [73] | Assignee | Tenneco Oil Company |
| | | Houston, Tex. |

[54] METHOD OF INCREASING THE PERMEABILITY OF A SUBTERRANEAN HYDROCARBON BEARING FORMATION
9 Claims, No Drawings

[52] U.S. Cl................................................ 166/303,
166/271, 166/308
[51] Int. Cl.......................................................... E21b 43/26
[50] Field of Search............................................ 166/271,
302, 303, 308; 175/11, 17

[56] References Cited
UNITED STATES PATENTS

| 2,661,066 | 12/1953 | Bond | 166/302 UX |
| 2,859,818 | 11/1958 | Hall et al. | 166/308 UX |
| 3,108,636 | 10/1963 | Peterson | 166/308 |
| 3,152,651 | 10/1964 | Ross | 175/11 |
| 3,195,634 | 7/1965 | Hill | 166/302 |

FOREIGN PATENTS

| 646,982 | 8/1962 | Canada | 166/308 |

*Primary Examiner*—Ian A. Calvert
*Attorney*—Eugene S. Coddou

ABSTRACT: A method of increasing the permeability of a subterranean hydrocarbon bearing formation penetrated by a wellbore and includes inducing a primary horizontal fracture in the formation which preferably extends from an injection well to a producing well. A system of microfractures is caused to be formed in a direction normal to the major fracture by cooling the formation by the introduction of a cryogenic fluid and by subsequently heating the formation adjacent to the primary fracture.

3,602,310

METHOD OF INCREASING THE PERMEABILITY OF A SUBTERRANEAN HYDROCARBON BEARING FORMATION

BACKGROUND OF THE INVENTION

1. Field of the Invention

This invention relates to a method of increasing the permeability of the subterranean hydrocarbon bearing formation penetrated by a wellbore. More particularly, this invention relates to a method of creating a primary fracture and a plurality of microfractures which are normal to the plane of the primary fracture which microfractures are created by cooling and subsequently heating the formation adjacent to the primary fracture, whereby production of hydrocarbons from the formation is facilitated.

2. Description of the Prior Art

In recovering certain hydrocarbons from subterranean formations such as extremely viscous oils and tars, the recovery thereof has been made difficult because of the extreme viscosity. Hence, conventional displacement-oil-type recovery processes have not been very successful. Therefore, there is a need for some means or method to alter the hydraulic characteristics of the rock and reduce the oil's viscosity in order to make recovery economically feasible and possible.

In the past, hydraulic fractures connecting injection and producing wells have been used to transport steam into an oil bearing formation. The only process by which heat can be transported into the rock containing normally immobile oil is by (1) conduction, and (2) subsequent natural convection arising from temperature gradients normal in the direction to the fracture. Heat transport by these processes is too slow to permit heating of the formation and its fluids in a reasonable length of time. It is generally known that oil bearing strata are stratified with individual strata having thicknesses equal to or in excess of 1 foot. It is also believed that a stratum is composed of microstrata, each of which has a thickness ranging upward from a fraction of an inch. These microstrata prevent fluid flow normal to their orientation. Thus, there is a need for a method to interconnect these microstrata with a complex system of microfractures which places the microstrata in hydraulic communication. Once the microfractures have been induced, then the oil, as for example the viscous type oils, can be recovered by a normal thermal-type recovery process.

SUMMARY OF THE INVENTION

It is therefore an object of this invention to provide an improved method for increasing the permeability of a subterranean hydrocarbon bearing formation whereby microfractures are induced into the formation in a direction normal to a primary fracture, thereby permitting the recovery of the oil by conventional thermal-type recovery processes.

Briefly stated, the method of this invention comprises the steps of injecting a fracturing fluid down the wellbore and into the subterranean formation to thereby induce a primary fracture therein. Thereafter, the formation adjacent the primary fracture is cooled by injecting a cooling fluid into the primary fracture. This cooling step is continued until the formation adjacent the primary fracture is cooled to below the freezing point of water. Thereafter, the formation adjacent the primary fracture is heated to above the freezing point of water, whereby microfractures are created extending normal to the primary fracture. The preferred cooling fluid is a cryogenic liquid and the formation is heated preferably by injecting a hot fluid into the primary fracture. It is also sometimes desirable to alternatively repeat the cooling and heating steps to further extend the microfractures. In certain embodiments of the method, the difference in temperature between the cooling fluid and the hot fluid is on the order of at least 800° F. In certain instances, the formation may also be penetrated by a production well, in which instances the primary fracture may be extended between the two wells during the fracturing step.

DESCRIPTION OF THE PREFERRED EMBODIMENTS

Initially, a primary fracture is induced into the hydrocarbon formation by injecting a hydraulic fracturing fluid down a wellbore and into the subterranean formation by conventional means. Thereafter, the formation adjacent the primary fracture is cooled by injecting a cooling fluid into the primary fracture. Suitable cooling fluids or cryogenic fluids include liquid nitrogen having a temperature on the order of −321° F., for example. This cooling step is continued until the formation adjacent the primary fracture is cooled to below the freezing point of water. If water is present in the formation being cooled, then the water will become frozen thereby expanding the same which causes some microfracturing.

Thereafter, the formation adjacent the primary fracture is heated to above the freezing point of water, after which a conventional thermal recovery process can be pursued to recover the hydrocarbons from the hydrocarbon bearing formation. One method of heating the formation is the injection of hot water, saturated steam or superheated steam into the primary fracture. The resulting temperature change, which may vary between 800° F. and 1,200° F. produces a thermal "shock". Rapid contraction and expansion of the formation when subjected to such thermal shock causes a system of microfractures connecting the reservoir with the primary fracture. The degree of penetration of the thermally induced fractures can be varied by alternately cooling and heating the reservoir via the primary fracture.

Having established the flow path, oil can be recovered by steam injection or combustion-type processes. If steam is injected into the primary fracture, heat is transported into the microfractured formation more rapidly. If combustion is employed, the microfractures permit an oxygen-containing gas to penetrate deeper "laterally" into the formation. Heat sources (hot fluid or combustion) are more thoroughly distributed within the reservoir by this invention. It is to be understood that the primary fracture is induced in the oil bearing zone of the formation and preferably in the center of the oil bearing stratum. The formation adjacent to the primary fracture is supercooled by the injection of a cryogenic liquid, for example. Thereafter the formation is rapidly heated by injecting hot fluid into the primary fracture with the resulting microfractures occurring.

Any number of cryogenic liquids may be injected, as for example liquid nitrogen, or liquid carbon dioxide. A form of heated water, (e.g. hot water, saturated water, moist steam, superheated steam) is preferred for injecting into the supercooled fracture, but any heated fluid (gas or liquid) can be used.

The formation is preferably subjected to alternate slugs of supercooled and then heated fluids. More than one treatment may be desired in order to produce adequate penetration of the microfractures into the formation. Superheated steam may be injected into the primary fracture by generating hot water or saturated steam at the surface and then expanding the fluid across a downhole orifice which is situated adjacent the primary fracture.

In those instances where the formation adjacent the primary fracture contains water, freezing of such formations causes the water therein to expand. In pores occupied only by water, this freezing and expansion will cause the aforesaid microfractures which will become open when the formation is subsequently heated. In those embodiments of the invention where the difference in temperature between the cooling fluid and the heating fluid is on the order of 800° F., then the thermal "shock" causes the formation of the microfractures.

In any event, once the desired microfractures have been induced, conventional oil recovery processes can be used to recover extremely viscous oil, for example. Once the microfractures have been established, any kind of recovery process, either primary or secondary, is enhanced thereby. The invention permits flow of low viscosity oils into the hydraulic fracture or primary fracture and subsequently to the producing well. Likewise, the microfractures permit the heatladen fluids to contact a greater volume of reservoir containing an extremely viscous oil.

Further modifications and alternative embodiments of the invention will be obvious to those skilled in the art in view of this description. Accordingly, this description is to be construed as illustrative only and is for the purpose of teaching those skilled in the art the manner of carrying out the invention.

What is claimed is:

1. In a method of increasing the permeability of a subterranean hydrocarbon bearing formation containing water and penetrated by a wellbore, the combination of steps comprising:
    injecting a hydraulic fracturing fluid down said wellbore and into said subterranean formation under sufficient pressure to thereby induce a generally horizontally extending primary fracture therein;
    cooling said formation adjacent said primary fracture by injecting a cooling fluid at a temperature below the freezing point of water into said primary fracture;
    continuing said cooling step until said formation adjacent said primary fracture is cooled to below the freezing point of water;
    and heating said thus cooled formation adjacent said primary fracture to above the freezing point of water, at a rate sufficiently rapid to create microfactures extending generally normal to said primary fracture.

2. The invention as claimed in claim 1 wherein:
said cooling fluid is a cryogenic liquid.

3. The invention as claimed in claim 1 wherein:
said formation is heated during said heating step by injecting a hot fluid into said primary fracture, whereby said microfractures are caused by thermal shock.

4. The invention as claimed in claim 1 including:
alternately repeating said cooling and heating steps to thereby further extend said microfractures.

5. The invention as claimed in claim 3 wherein:
the difference in temperature between said cooling fluid and said hot fluid is at least 800° F.

6. The invention as claimed in claim 1 wherein:
said formation is penetrated by a production well, and said primary fracture is extended between said injection well and said production well during said primary fracturing step.

7. The invention as claimed in claim 1 wherein:
said cooling fluid is a cryogenic liquid;
and said formation is heated during said heating step by injecting a hot fluid into said primary fracture, which hot fluid is at least about 800° F. higher in temperature than said cryogenic liquid, to thereby subject said formation adjacent said primary fracture to thermal shock to thereby cause said microfractures.

8. The invention as claimed in claim 7 wherein:
said hot fluid is a form of water.

9. The invention as claimed in claim 7 including:
alternately repeating said cooling and heating steps to thereby further extend said microfractures.